(12) United States Patent
Lin

(10) Patent No.: US 6,542,744 B1
(45) Date of Patent: Apr. 1, 2003

(54) HANDOFF IN A CELLULAR NETWORK

(75) Inventor: Harn-Jier Lin, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 88 days.

(21) Appl. No.: 09/597,186

(22) Filed: Jun. 20, 2000

(51) Int. Cl.⁷ .................................................. H04Q 7/20
(52) U.S. Cl. ...................... 455/437; 455/439; 455/442
(58) Field of Search ................................. 455/422, 432, 455/436, 438, 439, 440, 442, 443, 444; 370/331

(56) References Cited

U.S. PATENT DOCUMENTS

| | | | | |
|---|---|---|---|---|
| 5,471,644 A | * | 11/1995 | Schatz et al. ............... | 455/436 |
| 5,850,606 A | | 12/1998 | Bedingfield, Sr. et al. .. | 455/439 |
| 5,940,762 A | * | 8/1999 | Lee et al. .................... | 455/442 |
| 5,949,773 A | * | 9/1999 | Bhalla et al. ................ | 370/331 |
| 5,956,641 A | | 9/1999 | Bruckert et al. ............. | 455/442 |
| 5,978,679 A | * | 11/1999 | Agre .......................... | 455/442 |
| 6,246,673 B1 | * | 2/2000 | Tiedemann, Jr. et al. ... | 370/333 |
| 6,084,865 A | * | 7/2000 | Dent ........................... | 370/321 |
| 6,101,175 A | * | 8/2000 | Schormann et al. ......... | 370/331 |
| 6,131,030 A | * | 10/2000 | Schon et al. ................ | 455/438 |
| 6,154,653 A | * | 11/2000 | Jung ........................... | 455/442 |
| 6,173,183 B1 | * | 1/2001 | Abu-Amara et al. ........ | 455/442 |
| 6,185,429 B1 | * | 2/2001 | Gehrke et al. .............. | 455/502 |
| 6,205,128 B1 | * | 3/2001 | Le .............................. | 370/331 |
| 6,216,004 B1 | * | 4/2001 | Tiedman, Jr. et al. ....... | 455/442 |
| 6,230,014 B1 | * | 5/2001 | Freeze et al. ................ | 455/442 |
| 6,233,455 B1 | * | 5/2001 | Ramakrishna et al. ....... | 455/437 |
| 6,243,582 B1 | * | 6/2001 | Lahtinen ..................... | 455/436 |
| 6,253,085 B1 | * | 6/2001 | Bender ........................ | 455/442 |
| 6,263,205 B1 | * | 7/2001 | Yamaura et al. ............. | 455/442 |
| 6,295,452 B1 | * | 9/2001 | Choi ........................... | 455/436 |
| 6,304,755 B1 | * | 10/2001 | Tiedemann, Jr. et al. ... | 455/437 |

* cited by examiner

*Primary Examiner*—Nay Maung
*Assistant Examiner*—Joy K. Contee
(74) *Attorney, Agent, or Firm*—Steven A. May

(57) ABSTRACT

A handoff method in a cellular network for switching from an old base transceiver station (BTS) to a target BTS in an uninterrupted manner is provided according to the invention. The method includes the steps of determining the target BTS, establishing communication between the mobile station and the target BTS, wherein the mobile station receives communications continuously from both the old BTS and the target BTS, and terminating the transmission to the old BTS. The terminating step does not occur until after establishing communication between the mobile station and the target BTS.

16 Claims, 8 Drawing Sheets

CELL SITE COVERAGE PATTERN

HANDOFF IN A CELLULAR NETWORK

BACKGROUND OF THE INVENTION

1. Field of the Invention

The present invention relates generally to a handoff in a cellular network, and more particularly to eliminating an audio gap during a hand-off.

2. Description of the Background Art

Cellular phones and cellular phone networks have fairly recently become a widespread phenomenon. To many people, cell phones have become an essential communications tool to be used for business, family, travel, security, and entertainment communications purposes. Cell phones have become so commonplace that they are almost taken for granted.

The driving reason behind the popularity of cell phones is their mobility. People can use them almost anywhere, in a car, taxi, bus, or train, at home, at work, in restaurants or motels, while taking a walk, etc. This mobility is achieved through use of multiple base stations which communicate with cell phones using a radio frequency (RF) transmission, and which also communicate with the public switched telephone network (PSTN). Each base station has an assigned region of coverage known as a cell. When a mobile phone user moves from one cell to another, the base station must "hand-off" or transfer the call to the base station assigned to the other cell.

FIG. 1 shows a representative cell pattern, illustrating how a cell phone network achieves approximately continuous coverage. Each cell A, B, C, etc., represents a substantially circular coverage pattern generated by a cellular base station situated at the center of each circle. Due to overlap, a mobile station moving through the region is generally able to maintain contact with the cellular network to conduct a call.

A moving mobile station, for example moving from cell C to cell H, must be handed-off from base station C to base station H in order to maintain the call. This needs to be done without any interruption of service to the user. Therefore, the cellular network first must detect a need for a hand-off, then find a suitable target base station (determined by the direction of the motion of the mobile station), drop the current base station, and switch the call to the target base station. All of this is desirably done without audio gaps in the call.

FIG. 2 shows a typical CDMA (Code Division Multiple Access) cellular network system having a mobile switching center (MSC), one or more cellular base site controllers (CBSCs), and a plurality of base station transceivers (BTSs).

The MSC functions to route calls among the BTSs A–D, and also functions to interconnect the cellular network to a local public switched telephone network (PSTN). Through the PSTN, the MSC may be connected to geographically remote MSCs as well as to PSTN central switching offices.

A cellular network is typically constructed having a plurality of BTSs. These BTSs are under control of a CBSC. The CBSC interacts with a mobile station (i.e., a cellular phone) via a BTS to determine a suitable BTS for a call, and establishes a connection to the mobile station. A CBSC also provides message transfer and call switching as directed by the MSC. Control information received from an mobile station (through a BTS and a CBSC) is routed to the MSC. Calls received by a CBSC from the MSC, on a channel of a communication link between the MSC and CBSC, are switched under control of the CBSC to the appropriate BTS in communication with the mobile station. Routing of all calls (including those between mobile stations under the same CBSC) are routed through the MSC.

In order to properly conduct a hand-off, the MSC, the old CBSC and the old BTS, the target CBSC and the target BTS, and the mobile station must interchange data so that a call is routed through a new call path and also so that the old call path is terminated at a correct time. As part of the hand-off, and as part of normal operation, a mobile station stores an active BTS set and a target BTS set. The active BTS set is a set of all BTSs currently communicating with the mobile station (more than one BTS may be communicating, as in BTS A and BTS B, within a cell and common to a CBSC). The active BTS set therefore dictates what BTSs the mobile station transmits to and receives from. The target BTS set stores BTSs that, due to signal strength measurements, have been determined by the old CBSC to be handoff candidates.

Prior to a hand-off, the mobile station may transmit the contents of the target BTS set to the controlling CBSC (the old CBSC) so that the old CBSC may determine if a handoff should occur. In addition, the old CBSC may use the target BTS set to determine a target BTS. During the hand-off, the target BTS set may be inserted into the active BTS set by the old CBSC as part of creating the new call path.

It should be noted that switching between BTSs common to a CBSC is generally not a problem, as BTSs under a common CBSC are capable of simultaneously transmitting a call. Therefore, a mobile station traveling between BTS B and BTS A, for example, may be switched by the (common) CBSC, without the need for a handoff between CBSCs.

In the prior art, a handoff has typically been done in a straightforward and simple manner. FIGS. 2–6 are schematic diagrams showing a typical prior art handoff sequence. In FIG. 2, the MSC is conducting the call through a CBSC A and BTS B (the old BTS). In this example, the mobile station is traveling from the cell site of BTS B into the cell site of BTS C. The mobile station, by measuring signal strengths of signals received from various local BTSs, including BTS B and BTS C, is able to determine (or suggest) that a handoff should occur. Likewise, by using measured signal strengths, the mobile station is able to determine (or suggest) that the handoff should be from BTS B to BTS C.

In FIG. 3, as a second step in a prior art hand-off, a new call path is created. The new call path extends through the target CBSC B and the target BTS C to the mobile station. It should be noted that at this point in time the communication between the mobile station and the target BTS C is limited to a one-way communication, traveling only from the mobile station to the target BTS C.

In FIG. 4, as a third step, a Handoff Direction Message has just been sent from the old CBSC A to the mobile station. As a result, both the old CBSC A and the target CBSC B have been removed from the active BTS set of the mobile station until the mobile station reacquires the BTSs. The effect is that both the old call path and the new call path are temporarily suspended.

In FIG. 5, as a fourth step, the mobile station reacquires the connection to the CBSC B and to the BTS C. At this time, two way communication is initiated between the mobile device and the target BTS C, and only one way communication exists from the mobile device to the old BTS B.

In FIG. 6, as a fifth step, the handoff is completed and the old call path is terminated.

It should be noted that each step above may require a time period to accomplish. As can be seen from the sequence of FIGS. 2–5, a new call path is created and then as part of the switching both the old and new call paths to/from the mobile station are temporarily terminated (the call paths are re-established when the mobile station reacquires both BTSs). The result is an audio gap, wherein a portion of the transmitted signal, such as speech, for example, is simply lost. A typical resulting audio gap is on the order of about 250 milliseconds. This is very undesirable.

While this audio gap is troublesome and annoying in voice communications, the audio gap may have even more troublesome effects in data communications. Wireless modems have become increasingly common as people use devices such as laptop computers, personal digital assistants (PDAs), text-capable pagers, etc., to send and receive digital data communications in a wide variety of settings. For example, it is increasingly common for commuters to use wireless devices to access e-mail and perform stock trades, for example.

While wireless modems are a great convenience in many ways, they do not handle audio gaps well. A 250 millisecond audio gap may cause a wireless modem to lose data, receive corrupted data, or lose the connection entirely. This weakness is present because if a packet data frame is missing or truncated, reception of other data packets may be affected.

An additional drawback may result when hand-offs repeatedly occur. For example, if a user is moving so that he or she is traveling in an overlap region between adjacent cell sites, the mobile station may be repeatedly switched between the two cell sites. Therefore, the user may be subjected to multiple and ongoing audio gaps.

Prior art efforts to address this problem have included the addition of linkages between CBSCs, such as a land line. However, this is an expensive solution that may require additional land lines and modifications to existing hardware.

What is needed, therefore, are improvements in hand-offs in a cellular network.

DETAILED DESCRIPTION OF THE PREFERRED EMBODIMENTS

In order to eliminate audio gaps and problems associated with the prior art, the present invention employs a handoff scheme that eliminates the previously described drawbacks.

Figure 7:
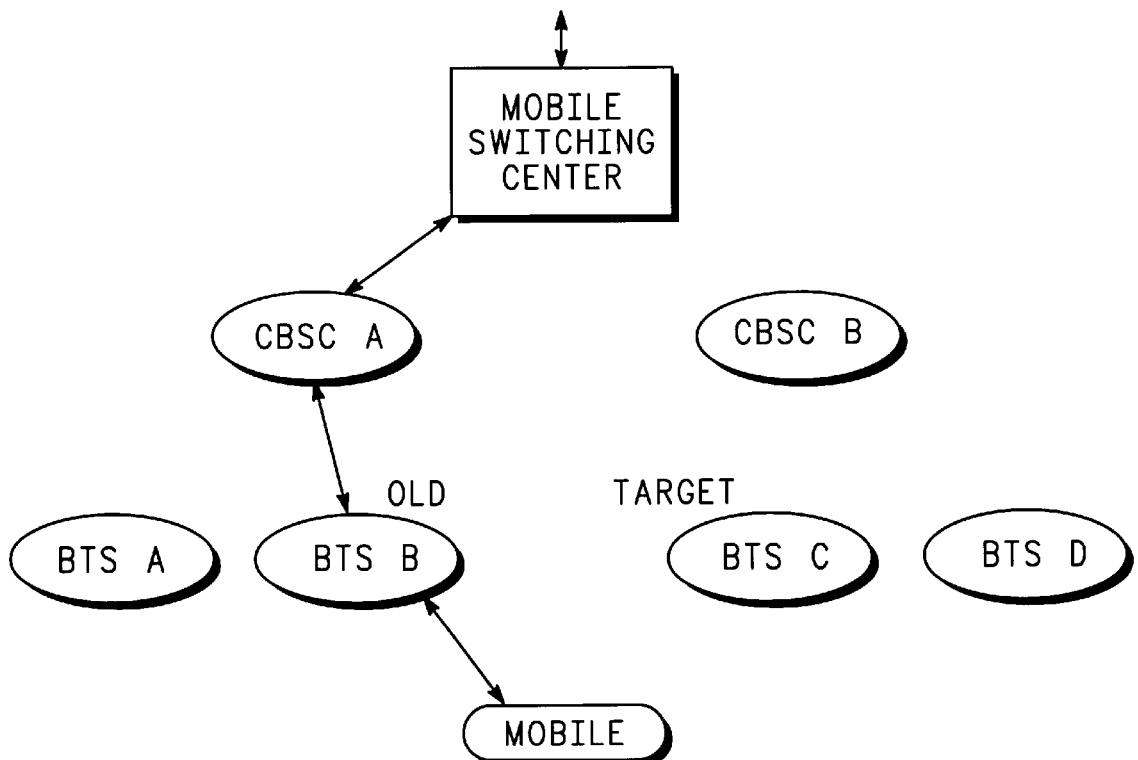
FIGS. 7–11 are schematic diagrams showing a handoff sequence according to an embodiment of the present invention.

FIGS. 7–11 are schematic diagrams showing a handoff sequence according to an embodiment of the present invention. FIG. 7 shows a cellular network, such as a CDMA network or other synchronized cellular network, wherein the mobile station is moving from the region of BTS B (the old BTS) to the region of BTS C (the target BTS). The cellular network has determined that a handoff must occur and has determined the target BTS or target BTS sector. Because a BTS may be constructed with multiple directional antennas, a BTS may generate a cell coverage area formed of sectors. The BTS may therefore communicate with the mobile station using a sector. Each BTS or BTS sector is identified by a unique PN (pseudorandom noise) number.

Figure 8:
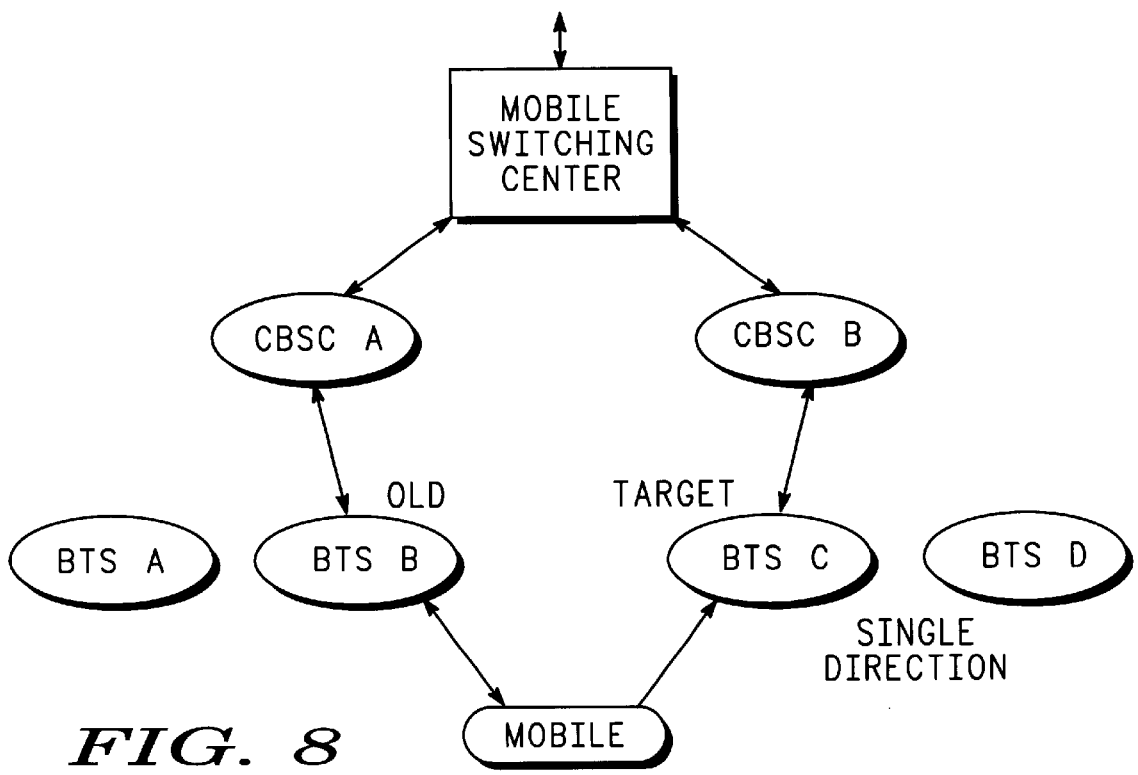

In FIG. 8, a new call path has been established from the mobile device to the target BTS C, while the old call path to the old BTS B still remains active. Due to the characteristics of a digital cellular network, the mobile station can communicate simultaneously with the old BTS B and the target BTS C on the reverse path (i.e., mobile to BTS). Because the call is transmitted as digital packet data, the mobile station can simultaneously send data through multiple call paths.

Figure 9:
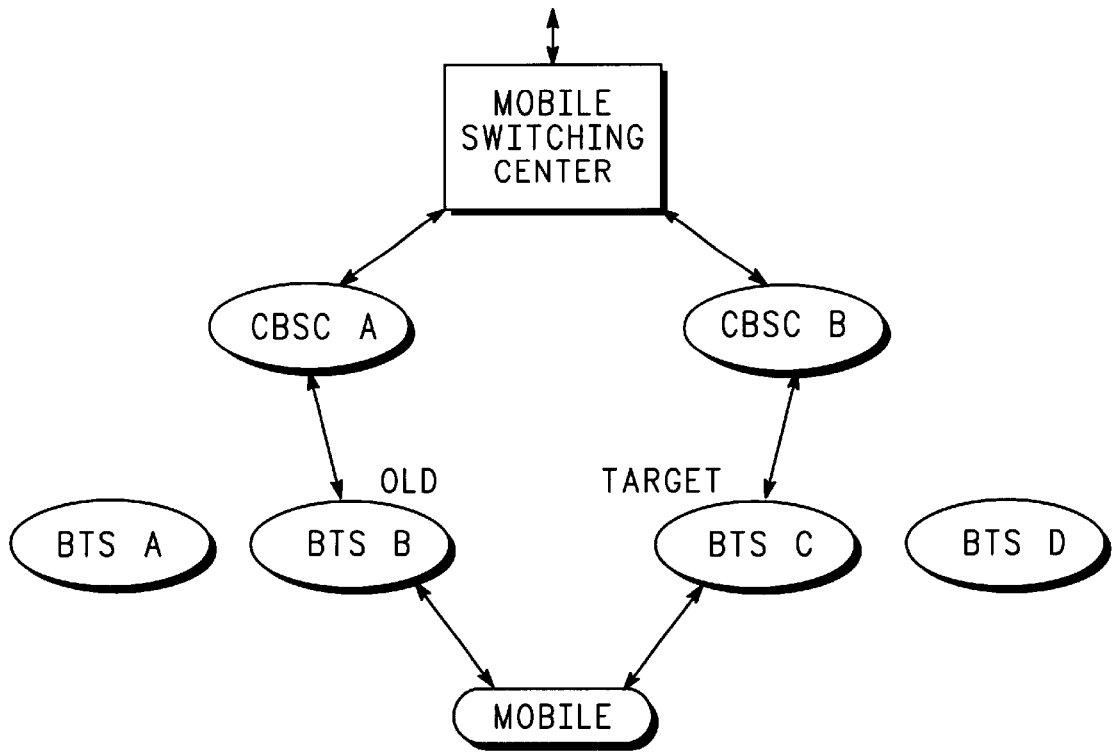

In FIG. 9, a first Handoff Direction Message has just been sent from the old CBSC A to the mobile station. The Handoff Direction Message is discussed below in conjunction with FIG. 13. The Handoff Direction Message, according to an aspect of the present invention, includes an active BTS set containing target sectors and old (current) sectors, which includes both the old BTS B or sector and the target BTS C or sector.

The step shown in FIG. 9 differs from the prior art in that the old call path (i.e., the old BTS) is not dropped, resulting in a continuous signal reception and transmission. As can be seen from the figure, the mobile station communicates with both the old BTS B and target BTS C.

Figure 10:
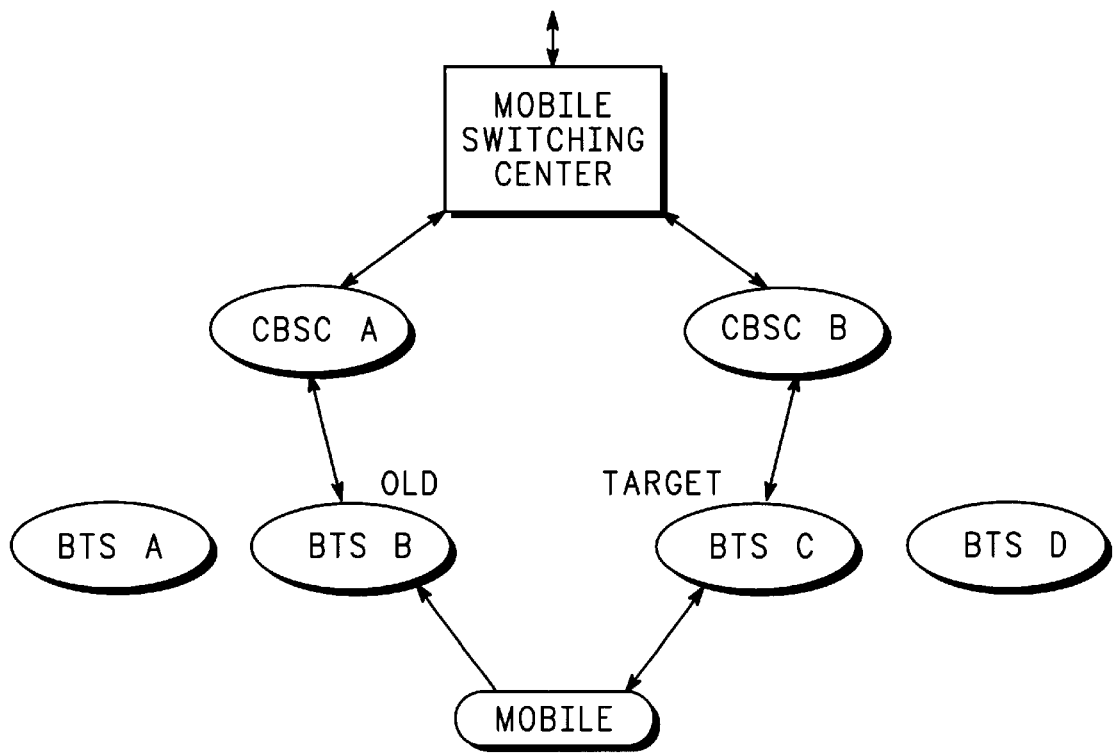

At this point, the mobile station may start ignoring transmissions and communications coming from the old BTS B. This may be done by instructing the mobile station to stop decoding traffic from BTS B (the old call path), as shown in FIG. 10. This is possible because a data packet has identification information embedded therein and the mobile station can determine which BTS the data packet came from. Therefore, the mobile station is capable of accepting data and communications from the target BTS C while ignoring communications from the old BTS B.

Figure 11:
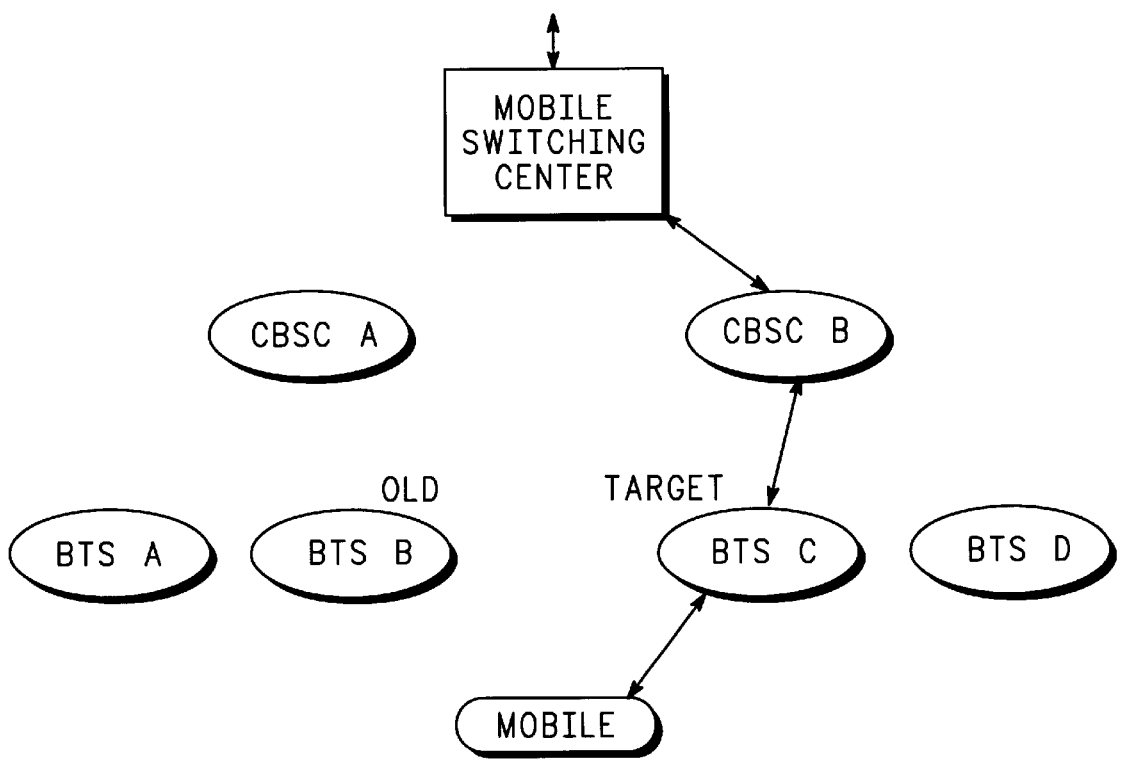

In FIG. 11, the old call path through the old BTS B has been terminated. The handoff is complete, and although there has been what is termed a hard handoff, i.e., actual switching between BTSs, it has been accomplished without any audio gap. As can be seen from this sequence, therefore, the new call path is established while maintaining the old call path.

Figure 12:
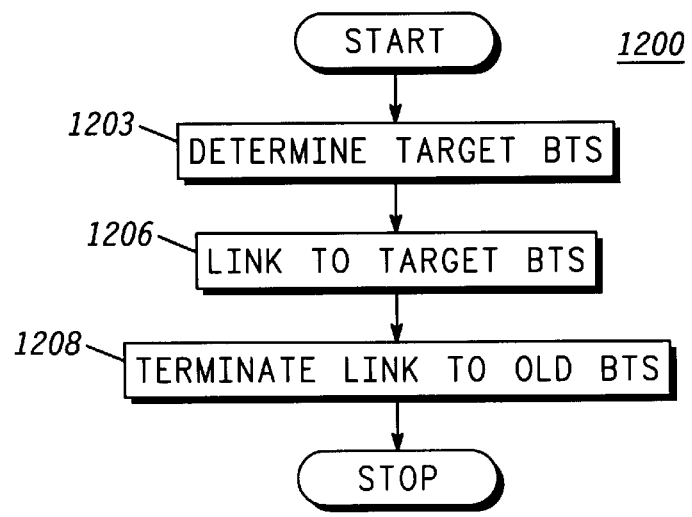
FIG. 12 is a flow chart of a general handoff procedure according to a first embodiment of the method of the present invention.

FIG. 12 is a flow chart 1200 of a general handoff procedure according to a first embodiment of the method of the present invention. In step 1203, the cellular network determines a target BTS by determining signal strengths measured at the mobile station. In geographical settings such as urban settings where many cell sites exist, the mobile station may be receiving signals from a plurality of BTSs. Therefore, the old CBSC A can choose a strongest or most suitable target BTS. This is preferably done by reading signal strength measurements from the mobile station, but may also accommodate other factors such as a travel path of the mobile station.

The handoff is initiated by a handoff suggestion message sent from the mobile station to the old CBSC A (i.e., a pilot strength measurement message). The old CBSC A directs the handoff by sending appropriate messages, as discussed in more detail below in the text accompanying FIG. 13.

In step 1206, the new call path is established between the target CBSC B, the target BTS C, and the mobile station.

In step 1208, the cellular network terminates the old call path. Therefore, during the time period between steps 1206 and 1208, the mobile station is receiving communications continuously from both the old BTS B and the target BTS C.

Figure 13:
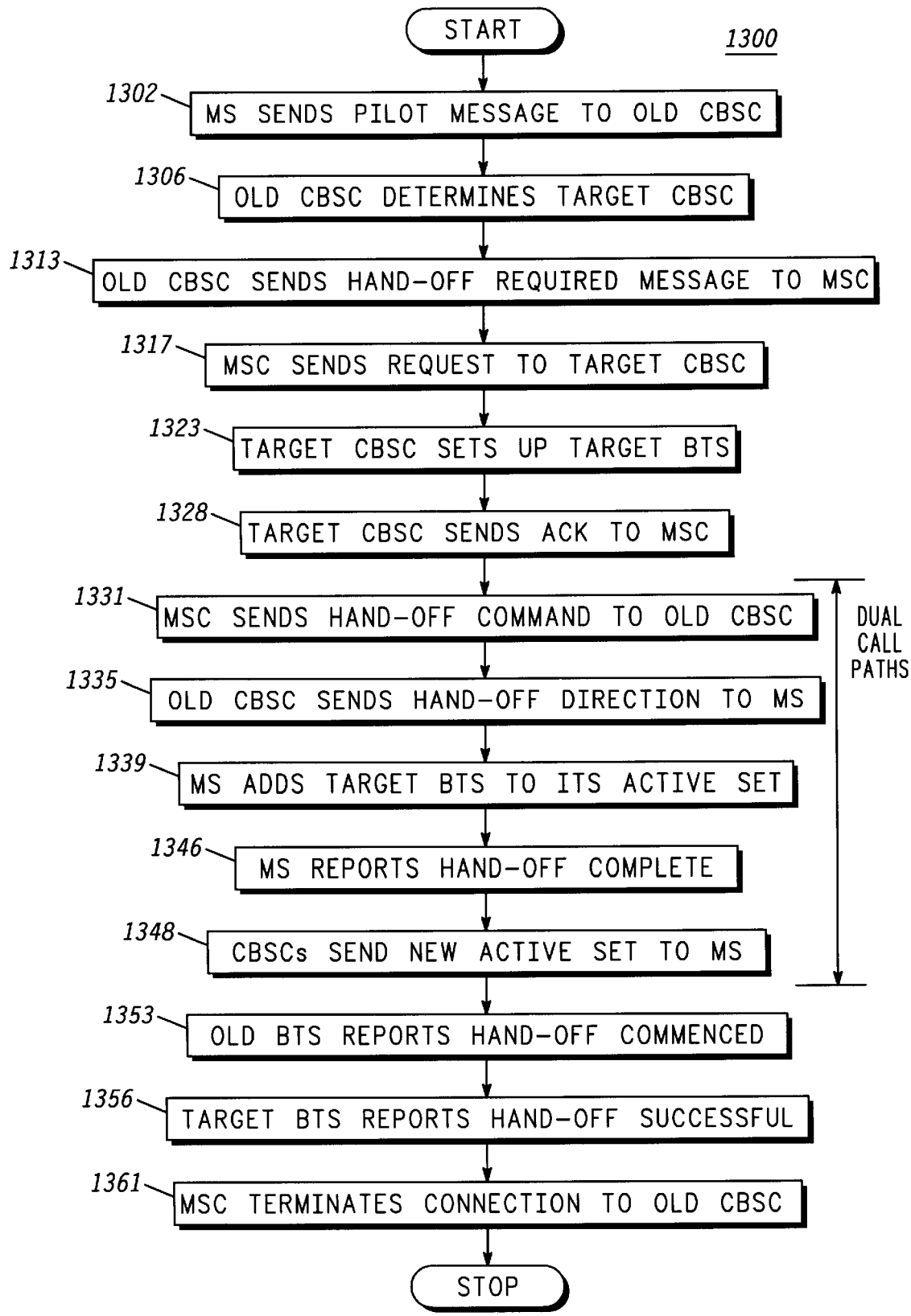
FIG. 13 is a flow chart explaining the detailed steps involved in the procedure shown generally in FIG. 12.

FIG. 13 is a flow chart 1300 explaining the detailed steps involved in the procedure shown generally in FIG. 12. The flowchart 1300 illustrates message traffic within the cellular infrastructure, implementing the handoff of the present invention. Although the present invention may be implemented by messages generated and transmitted by the CBSCs within the network, all message traffic will be discussed in order to explain the handoff process.

In step 1302, the mobile station (MS) sends a pilot strength measurement message to the old CBSC A. The pilot strength measurement message contains one or more pattern strength measurements. A pattern strength measurement is a measurement of a signal received from a BTS or BTSs. The pattern strength measurements may be used to determine when to perform a hand-off, and may be used to determine a target BTS or target BTS sector.

In step 1306, the old CBSC A uses the received signal strength measurements to determine that a handoff is required, and to determine a target CBSC.

In step 1313, the old CBSC A sends a Handoff Required Message to the MSC. The various messages used to perform a handoff may be found in the Telecommunications Industry Association standard TIA/EIA/IS-803-2000, incorporated herein by reference. The Handoff Required Message includes a cell identifier list field, wherein the old CBSC A may include a target CBSC, such as the target CBSC C. Through this message, the MSC is informed of the target CBSC.

In step 1317, the MSC sends a Handoff Request Message to the target CBSC B. The Handoff Request Message also includes a cell identifier list field that tells the target CBSC which BTSs to set up. The Handoff Request Message causes the target CBSC B to attempt to establish a connection to the target BTS C.

In step 1323, the target CBSC B sets up the target BTS C. This may include establishing a communications link between the MSC, the target CBSC B, and the target BTS C. At this point, the target BTS C is receiving data from the mobile station (a reverse RF link).

In step 1328, the target CBSC B sends a Handoff Acknowledge Message (Ack) to the MSC acknowledging the handoff Request Message. The Ack includes a cell identifier list that lists all target BTSs (or BTS sectors) successfully set up by the target CBSC B (i.e., identifies the target BTS). One or more BTSs may be a target BTS. In addition, the Ack may be used to update the mobile station's parameters using the Extended Handoff Direction Parameters and the Hard Handoff Parameters fields (the mobile station may still have old BTS parameters). The MSC responds to the Ack message by establishing a three-way connection between the terrestrial circuit connected to the source CBSC and the terrestrial circuit connected to the target CBSC. In the preferred embodiment of the present invention, the three-way connection allows for both source and target CBSCs to perform call control simultaneously. In other words, unlike the prior art, in the preferred embodiment of the present invention call control messages are transmitted to the mobile unit simultaneously via both the source and the target base stations.

In the preferred embodiment the MSC and the CBSCs are connected by a terrestrial circuit, such as a telephone line. However, it should be noted that alternatively the MSC and the CBSCs could communicate over a RF link, a microwave link, an infrared link, etc.

The MSC performs several important functions. First, data flowing from the mobile station to either the old CBSC A or target CBSC B (uplink data) may be combined in the MSC to ensure full and complete data.

Second, data flowing from the MSC to the mobile station (downlink data) may be broadcast through all CBSCs to ensure that it is received by the mobile station.

In step 1331, the MSC sends a Handoff Command Message to the old CBSC A. The Handoff Command Message is similar to the Ack, and is used by the MSC to pass the data from the target CBSC B to the old CBSC A. The target CBSC/BTS are not yet communicating with the mobile station, so the data must flow from the target CBSC B to the MSC to the old CBSC A, and the old CBSC A must then pass it on to the mobile station.

In step 1335, the old CBSC A sends a first Handoff Direction Message to the mobile station. The Handoff Direction Message includes an active set that lists BTSs or BTS sectors that communicate with the mobile station. Using the active set, the old CBSC A can add a (new) target BTS and therefore make the mobile station communicate with the target BTS.

Three Handoff Direction Messages exist, with the applicable message being determined by the cellular network type or the mobile phone type. The first is an IS-95A Extended Handoff Direction Message which is defined in the publication "Mobile Station-Base Station Compatibility Standard for Dual-Mode Wideband Spread Spectrum Cellular System," document TIA/EIA/IS95-A, available from the Telecommunications Industry Association (TIA) and the Electronic Industries Association (EIA). The second message is an IS-95B General Handoff Direction Message, defined in "Mobile Station-Base Station Compatibility Standard for Dual-Mode Spread Spectrum Systems," document TIA/EIA-95-B, ANSI Publication version, December 1998. The third message is an IS-95C Universal Handoff Direction Message (commonly referred to as IS-2000), defined in "Introduction to cdma2000 Standards for Spread Spectrum Systems," document TIA/EIA/IS-2000.5-A, March 2000.

The active set of the first Handoff Direction Message includes all of the BTSs set up by the target CBSC B, such as the target BTS C and the old BTS B.

Figure 1:
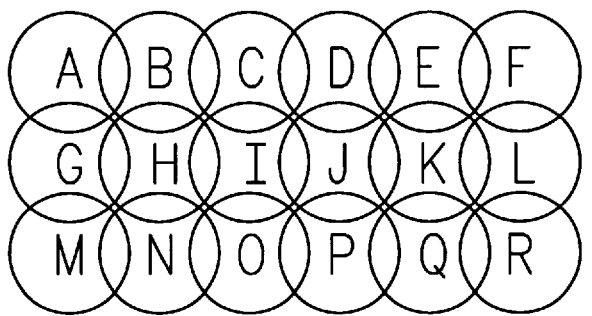
FIG. 1 shows a representative cell pattern, illustrating how a cell phone network achieves approximately continuous coverage.
Figure 2:
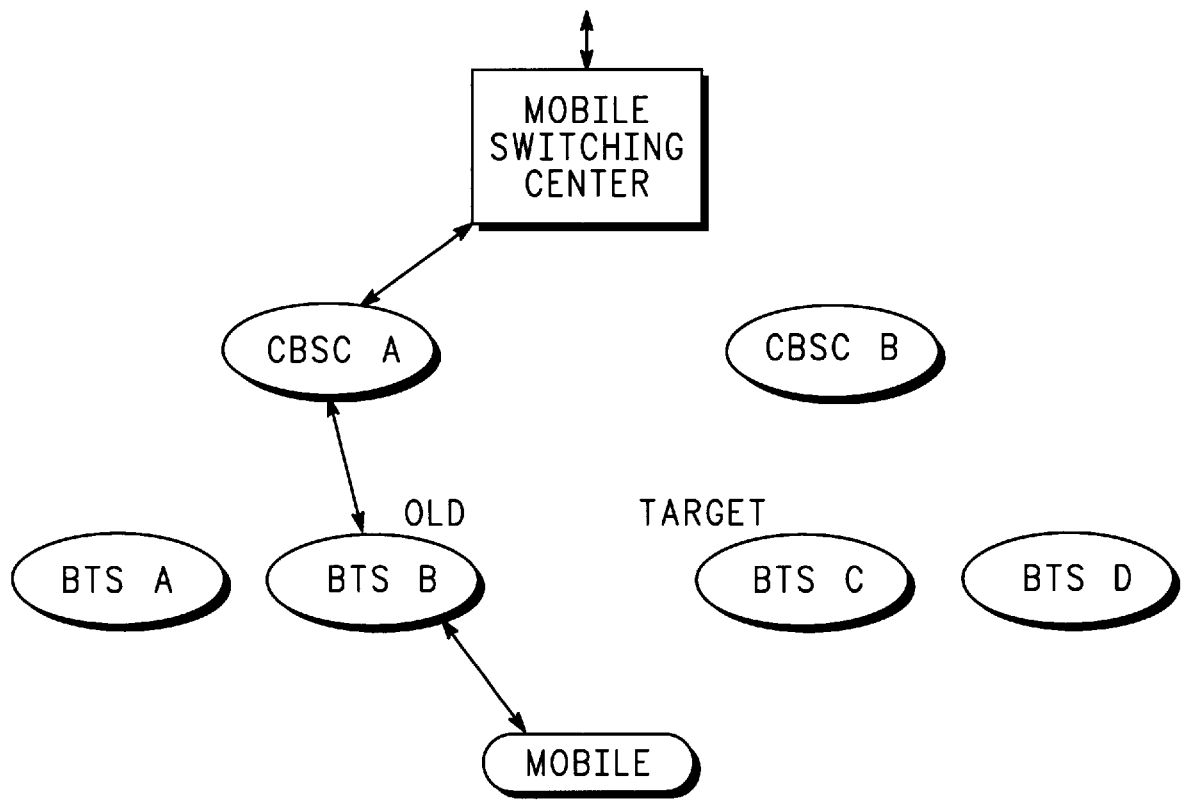
FIGS. 2–6 are schematic diagrams showing a typical prior art handoff sequence.
Figure 3:
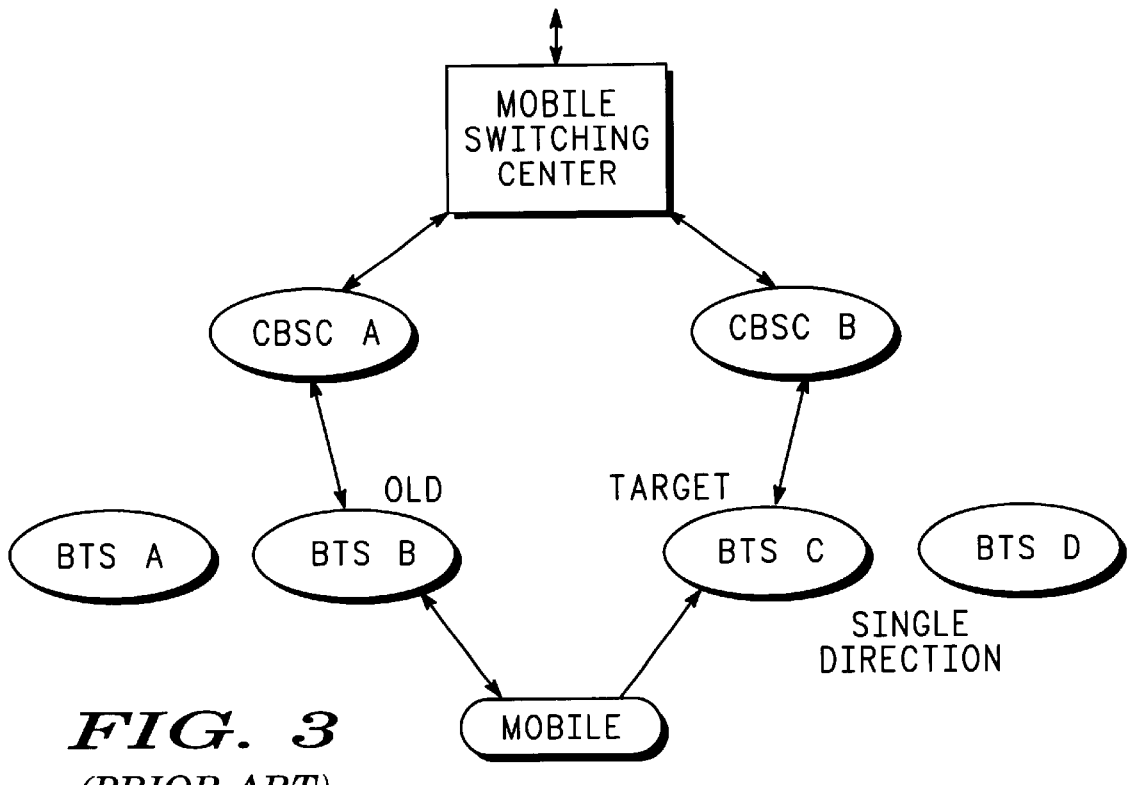
Figure 4:
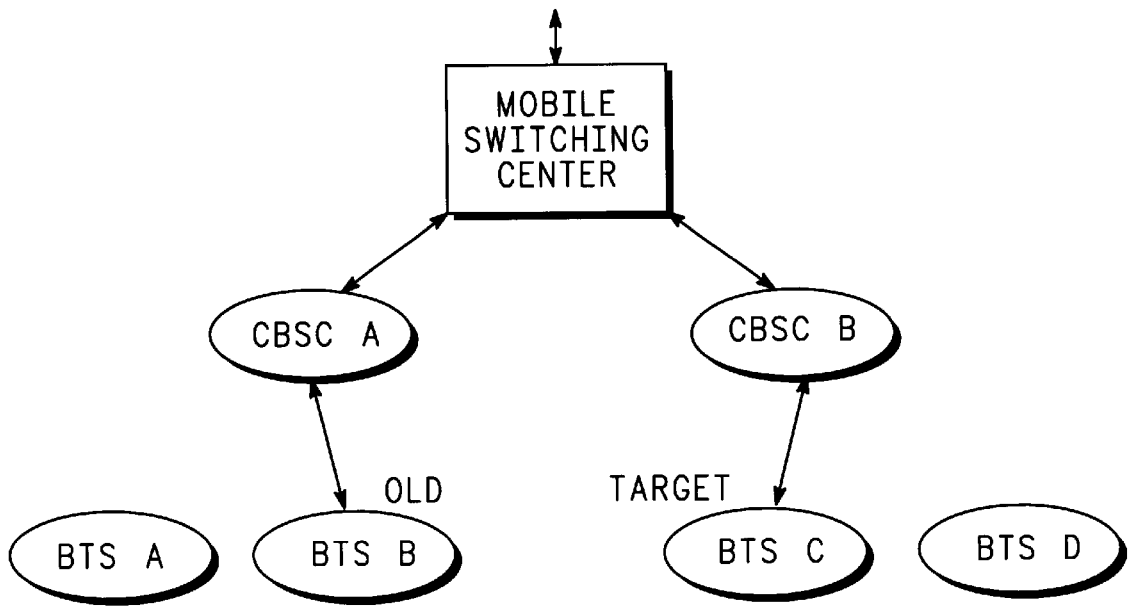
Figure 5:
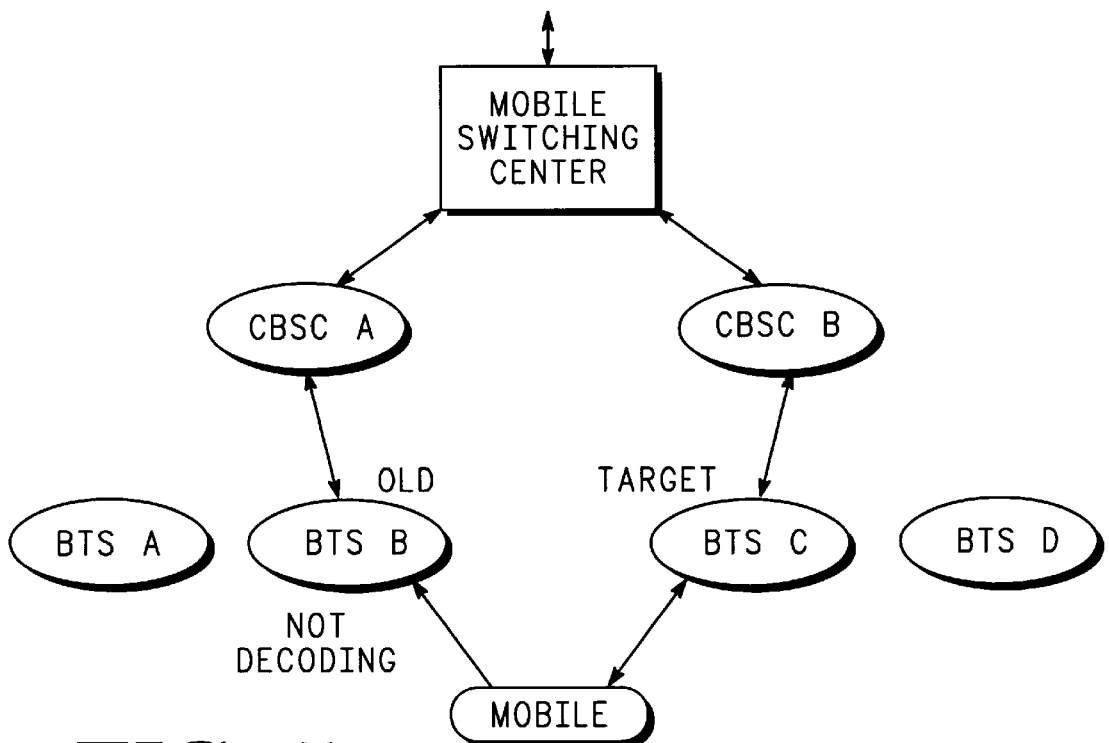
Figure 6:
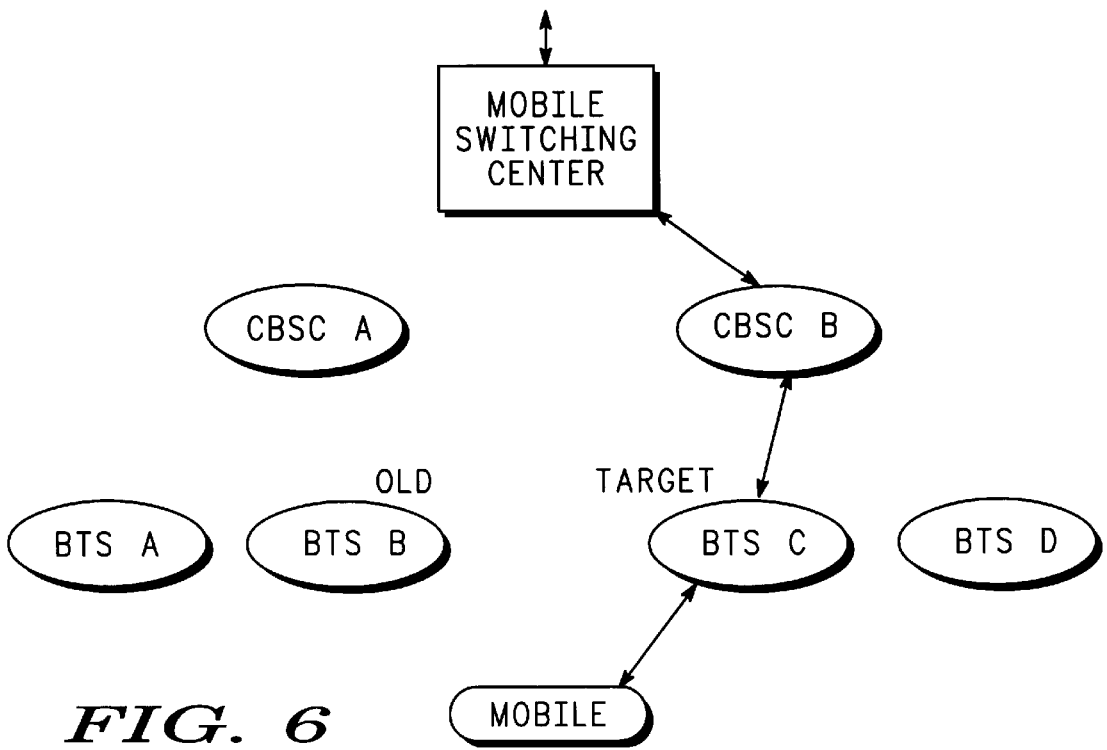

In the prior art, a single Handoff Direction Message is sent. The Handoff Direction Message of the prior art handoff does not include the old BTS B in the active set, and at this point the mobile station stops decoding data from the old CBSC A, as shown in FIG. 4. However, in the handoff of the present invention, the old call path is continuously maintained, as shown in FIG. 9. This is because the mobile station decodes transmissions from all BTSs in the active set.

The Handoff Direction Message also includes an L2 (layer 2) reset field. In the first Handoff Direction Message the L2 reset field is set to ON. The L2 field may be used to reset acknowledgement processing in the mobile station by resetting the L2 sequence number to zero (matching the L2 sequence number in the target CBSC B), so that the mobile station will be able to communicate with both the old BTS B and the target BTS C.

The Handoff Direction Message further includes an FPC reset field (Forward traffic channel Power Control). In the first Handoff Direction Message the FPC reset field is set to ON (the transmit power is set to a default value). This is done to synchronize the power control between the mobile station, the old CBSC A, and the target CBSC B.

The Handoff Direction Message is received by the mobile station and causes the mobile station to execute the handoff instruction, which results in the set up of a new two-way connection between the mobile station, the target BTS C, and the target CBSC B. On the forward link (data traveling from the cellular infrastructure to the mobile station), the information broadcast from the three-way bridge in the MSC will be sent through both the new call path and the old call path forward links. On the reverse link (data traveling from the mobile station to the cellular infrastructure), the information the mobile station transmits will be received by both the new and the old BTSs and be combined by the three-way bridge in the MSC.

In step 1339, the mobile station, as a result of the Handoff Direction Message, adds the target BTS to its active set.

In step 1346, the mobile station reports that the handoff is complete by sending a Handoff Complete Message. The Handoff Complete Message is received by the old CBSC A and by the target CBSC B. The Handoff Complete Message contains the active set of the mobile station, which should be identical to the active set in the Handoff Direction Message. If the active set is not identical, the old CBSC A may resend the Handoff Direction Message in order to correct the active set in the mobile station.

In step 1348, both the old and target CBSCs send a second Handoff Direction Message (to the mobile station) in response to the Handoff Complete Message. The second Handoff Direction Message contains the current active set. The second Handoff Direction Message excludes some source (old) BTSs, therefore dropping the old BTS/source sector.

In step 1353, the old BTS sends a Handoff Commenced Message to the MSC reporting that the handoff has been successfully performed. Through this message, the old BTS B acknowledges that it is dropped from the active set, and the old CBSC A acknowledges that it has dropped the old BTS B and that the mobile station has moved on to the target BTS C.

In step 1356, the target BTS sends a Handoff Complete Message to the MSC reporting that the mobile station has successfully acquired the target BTS.

In step 1361, the MSC terminates the connection to the old CBSC A and the old BTS (the old call path). The handoff is now complete, and the call path exists only to the target CBSC B and target BTS.

The present invention avoids the audio gap of the prior art by modifying the handoff sequence. The handoff sequence of the present invention includes both old and target BTSs/sectors in the Handoff Direction Message, and sends two Handoff Direction Messages in order to perform the hard handoff without an audio gap.

It should be noted that while the hand-offs described above occur within a MSC, the hand-offs described could also be occurring between separate MSCs linked by a three-way bridge and having CBSCs according to the present invention.

Figure 14:
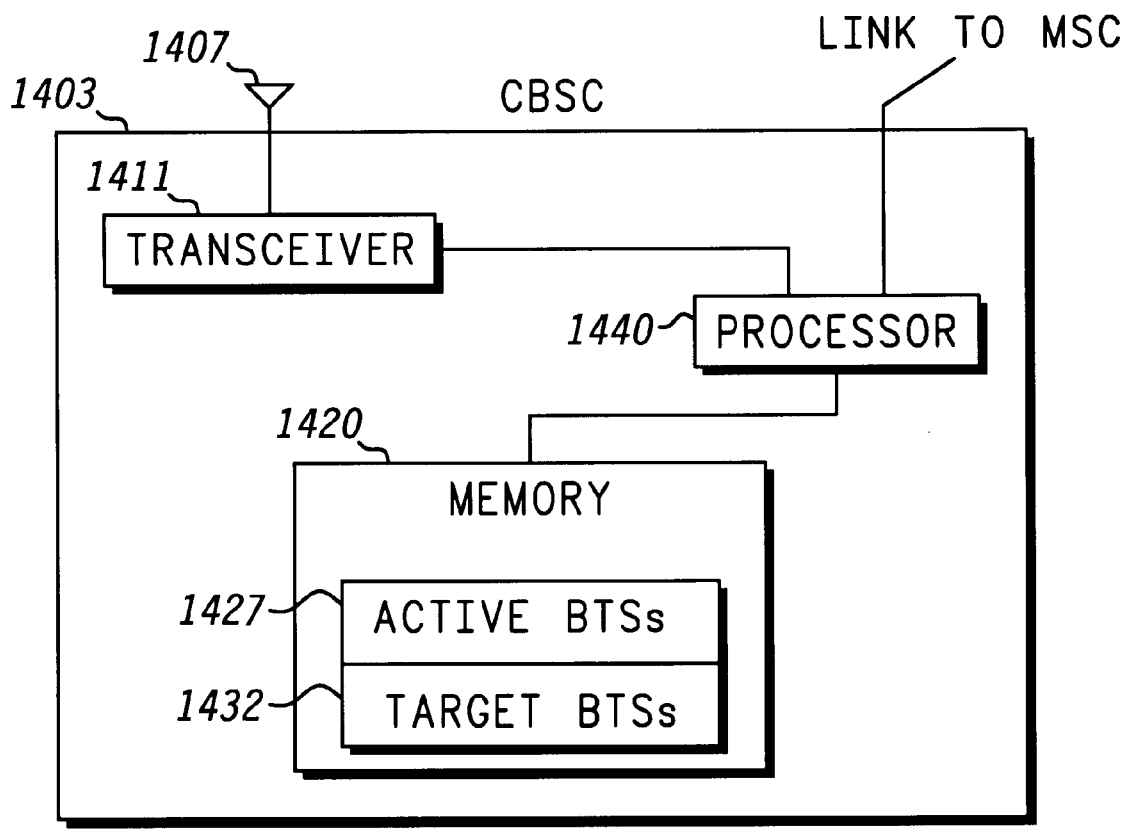
FIG. 14 shows a cellular base site controller implementing the handoff of the present invention.

FIG. 14 shows a CBSC 1403 implementing the handoff of the present invention. The CBSC 1403 includes at least one antenna 1407, at least one transceiver 1411, at least one processor 1414, at least one decoder 1418, and a memory 1420. The memory 1420 may contain information pertaining to at least one BTS and at least one mobile station. This may include, for a particular mobile station, an active BTS set 1427 and a target BTS set 1432. Multiple active BTS sets 1427 and target BTS sets 1432 may be stored within the CBSC 1403.

In operation, the CBSC 1403 may communicate with an MSC via link such as a terrestrial circuit or RF link, for example, and may communicate with one or more BTSs via at least one antenna 1407. The CBSC 1403 indirectly communicates with mobile stations through the RF link to the BTSs.

The CBSC 1403 of the present invention may perform hand-offs of mobile stations, and may replace a conventional CBSC so that a conventional hard handoff is replaced by a handoff that does not create an audio gap. It should be noted that the actual CBSC hardware does not need to be replaced, as the functionality of the present invention may be implemented in a controlling CBSC software stored within the memory 1420.

A CBSC 1403 of the present invention stores a mobile station active BTS set 1427 and a handoff target BTSs 1432 for each mobile station. The active BTS set 1427 and the target BTS set 1432 are created in the old CBSC A 1403, and may be sent to the target CBSC 1403.

The active BTS set 1427 is a set of all BTSs currently communicating with the mobile station. The old CBSC A 1403, according to an embodiment of the present invention, does not remove itself from the active BTS set 1427 until the target BTS reports that the handoff is successful (i.e., the new call path is fully established). After the handoff successful message, the old CBSC A 1403 may remove itself from the active BTS set 1427.

By removing a BTS from the active BTS set 1427, the mobile station will stop decoding data from that BTS, and the first step in terminating a call path is accomplished. As an important feature of the present invention, the first step does not remove all of the old BTSs from the active BTS set 1427 so that the mobile station will not stop decoding data from the old call path. If the old call path were unconditionally terminated in both directions between the MSC, the old CBSC A, the old BTS B, and the mobile station, the mobile station could be deprived of necessary data. The result could be audio anomalies or improper operation of the mobile station.

The target BTS set 1432 stores BTSs that, due to signal strength measurements, have been determined by the old CBSC 1403 to be handoff candidates. One or more of these BTSs may be included in the handoff required message that initiates the hand-off. The target BTSs may of course change over time if the mobile station is moving.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A handoff method in a cellular network for switching a call between a mobile station and an old base transceiver station (BTS) utilizing a first base station controller to a target BTS utilizing a second base station controller in an uninterrupted manner, comprising the steps of:

determining said target BTS;

establishing communication between said mobile station and said target BTS without requiring a signal connection between said first base station controller and said second base station controller, wherein said mobile station receives communications continuously from both said old BTS and said target BTS;

transmitting control messages to the mobile unit via both the source and the target base stations and their respective controllers to transfer radio connection and call control; and terminating a call path from said mobile station to said old BTS only after fully establishing communication between said mobile station and said target BTS.

2. The method of claim 1, wherein said method applies to an inter-CBSC hand-off.

3. The method of claim 1, wherein said method applies to an intra-MSC hand-off.

4. The method of claim 1, wherein said method applies to an inter-MSC hand-off.

5. The method of claim 1, wherein said cellular network is a synchronized cellular network.

6. The method of claim 1, wherein said cellular network is a CDMA cellular network.

7. The method of claim 1, wherein a Handoff Direction Message sent from said old CBSC to said mobile station as part of said establishing communication step contains an active BTS set that includes both said old BTS and said target BTS.

8. The method of claim 1, wherein said method further includes a step of resetting a layer 2 sequence number.

9. A handoff method in a cellular network for switching a call between a mobile station and an old base transceiver station (BTS) to a target BTS in an uninterrupted manner, comprising the steps of:

determining said target BTS in an old cellular base site controller (CBSC) controlling said old BTS;

sending target BTS information from said old CBSC to a mobile switching center (MSC);

receiving in a target CBSC a request to establish a new call path including said target BTS;

establishing the new call path including said target BTS, establishment of said new call path being performed by said target CBSC and not requiring a signal connection between said target CBSC and said old CBSC;

receiving in said old CBSC a handoff command from said MSC;

sending a Handoff Direction Message from said old CBSC to said mobile station, wherein said mobile station receives communications continuously from both said old BTS and said target BTS;

receiving a handoff complete from said mobile station in said old CBSC and in said target CBSC;

sending an active set from said old CBSC and from said target CBSC to said mobile station, said active set setting up said new call path by listing said target BTS as an active BTS; and wherein termination of said old call path does not occur until after completely establishing said new call path.

10. The method of claim 9, wherein said method applies to an inter-CBSC hand-off.

11. The method of claim 9, wherein said method applies to an intra-MSC hand-off.

12. The method of claim 9, wherein said method applies to an inter-MSC hand-off.

13. The method of claim 9, wherein said cellular network is a synchronized cellular network.

14. The method of claim 9, wherein said cellular network is a CDMA cellular network.

15. The method of claim 9, wherein a Handoff Direction Message sent from said old CBSC to said mobile station as part of said establishing communication step contains an active BTS set that includes both said old BTS and said target BTS.

16. The method of claim 9, wherein said method further includes a step of resetting a layer 2 sequence number.

* * * * *